(12) United States Patent
Thompson

(10) Patent No.: US 12,315,127 B2
(45) Date of Patent: May 27, 2025

(54) REPORTING METHOD

(71) Applicant: John K. Thompson, Fultondale, AL (US)

(72) Inventor: John K. Thompson, Fultondale, AL (US)

(73) Assignee: FLX Systems, LLC, Wyoming, MI (US)

( * ) Notice: Subject to any disclaimer, the term of this patent is extended or adjusted under 35 U.S.C. 154(b) by 635 days.

(21) Appl. No.: 16/782,635

(22) Filed: Feb. 5, 2020

(65) Prior Publication Data
US 2020/0250810 A1 Aug. 6, 2020

Related U.S. Application Data

(60) Provisional application No. 62/801,435, filed on Feb. 5, 2019.

(51) Int. Cl.
| | |
|---|---|
| *G06T 7/00* | (2017.01) |
| *G06F 40/174* | (2020.01) |
| *G06Q 10/0631* | (2023.01) |
| *G06Q 10/20* | (2023.01) |
| *H04N 23/63* | (2023.01) |

(52) U.S. Cl.
CPC .......... *G06T 7/0004* (2013.01); *G06F 40/174* (2020.01); *G06Q 10/06311* (2013.01); *G06Q 10/20* (2013.01); *G06T 2207/30248* (2013.01); *H04N 23/631* (2023.01)

(58) Field of Classification Search
None
See application file for complete search history.

(56) References Cited

U.S. PATENT DOCUMENTS

| | | | | |
|---|---|---|---|---|
| 8,395,661 | B1 * | 3/2013 | Olsson | G03B 37/005 |
| | | | | 348/207.99 |
| 8,736,704 | B2 * | 5/2014 | Jasinski | H04N 23/951 |
| | | | | 348/222.1 |
| 9,004,353 | B1 * | 4/2015 | Block | G06Q 20/308 |
| | | | | 382/137 |
| 9,432,631 | B2 * | 8/2016 | Allegra | H04W 4/90 |
| 9,742,753 | B2 * | 8/2017 | Talley | H04L 67/306 |
| 9,824,397 | B1 * | 11/2017 | Patel | G06T 7/60 |
| 10,019,133 | B1 * | 7/2018 | McNeill | H04L 51/56 |
| 10,110,807 | B2 * | 10/2018 | Mukai | H04N 23/631 |
| 2005/0010808 | A1 * | 1/2005 | Wixson | H04N 21/2187 |
| | | | | 726/26 |

(Continued)

OTHER PUBLICATIONS

Rekimoto, Jun, and Katashi Nagao. "The world through the computer: Computer augmented interaction with real world environments." Proceedings of the 8th annual ACM symposium on User interface and software technology. 1995. (Year: 1995).*

(Continued)

*Primary Examiner* — Gurkanwaljit Singh
(74) *Attorney, Agent, or Firm* — Miller & Martin PLLC

(57) ABSTRACT

A paperless image-based reporting method provides graphic overlays on a display of a camera equipped mobile device which provides instructions and or permit input while also permitting a user to capture at least one image desired for a report. Some embodiments permit the overlay to capture still images while simultaneously capturing video with a single camera. A report can be automatically generated and then sent to a server.

19 Claims, 8 Drawing Sheets

(56) References Cited

U.S. PATENT DOCUMENTS

| | | | | |
|---|---|---|---|---|
| 2006/0171453 | A1* | 8/2006 | Rohlfing | G08B 13/19632 348/E7.086 |
| 2007/0118281 | A1* | 5/2007 | Adam | G08G 1/09675 340/995.13 |
| 2010/0048242 | A1* | 2/2010 | Rhoads | H04N 5/23222 455/556.1 |
| 2012/0084807 | A1* | 4/2012 | Thompson | G06Q 30/0276 725/32 |
| 2012/0089470 | A1* | 4/2012 | Barnes, Jr. | H04M 1/724 705/16 |
| 2012/0096490 | A1* | 4/2012 | Barnes, Jr. | G06Q 10/02 725/34 |
| 2012/0249787 | A1* | 10/2012 | Allegra | G06V 40/172 348/143 |
| 2013/0063550 | A1* | 3/2013 | Ritchey | G09G 5/026 345/207 |
| 2013/0155307 | A1* | 6/2013 | Bilbrey | H04N 21/4788 345/173 |
| 2013/0182002 | A1* | 7/2013 | Macciola | G06V 10/25 345/589 |
| 2014/0006129 | A1* | 1/2014 | Heath | G06Q 30/02 705/14.23 |
| 2014/0129942 | A1* | 5/2014 | Rathod | H04N 21/44226 715/720 |
| 2014/0143218 | A1* | 5/2014 | Sanghavi | G06F 16/48 707/695 |
| 2014/0337479 | A1* | 11/2014 | Stangas | H04W 4/00 709/219 |
| 2015/0317801 | A1* | 11/2015 | Bentley | G08B 21/043 382/107 |
| 2016/0171622 | A1* | 6/2016 | Perkins | G06Q 40/08 705/4 |
| 2016/0253083 | A1* | 9/2016 | Lee | H04M 1/27475 715/771 |
| 2016/0261793 | A1* | 9/2016 | Sivan | G06F 3/013 |
| 2016/0292881 | A1* | 10/2016 | Bose | G08B 21/0492 |
| 2017/0262139 | A1* | 9/2017 | Patel | G06F 3/0482 |
| 2018/0315076 | A1* | 11/2018 | Andreou | G06Q 30/0241 |
| 2018/0330756 | A1* | 11/2018 | MacDonald | G06F 16/951 |
| 2018/0350144 | A1* | 12/2018 | Rathod | G06Q 20/3224 |
| 2019/0020855 | A1* | 1/2019 | Shimada | H04N 7/185 |
| 2019/0182415 | A1* | 6/2019 | Sivan | G06F 3/013 |
| 2019/0213311 | A1* | 7/2019 | Tussy | G06V 10/17 |
| 2019/0394149 | A1* | 12/2019 | McNeill | H04L 51/56 |

OTHER PUBLICATIONS

Büring, Thorsten, Jens Gerken, and Harald Reiterer. "User interaction with scatterplots on small screens—a comparative evaluation of geometric-semantic zoom and fisheye distortion." IEEE Transactions on Visualization and Computer Graphics 12.5 (2006): 829-836. (Year: 2006).*

Horak, Karl Emanuel, DeLand, Sharon Marie, and Blair, Dianna Sue. The feasibility of mobile computing for on-site inspection . . . United States: N. p., 2014. Web. doi: 10.2172/1162192. (Year: 2014).*

* cited by examiner

REPORTING METHOD

FIELD OF THE INVENTION

The present invention relates to video based reporting systems and more particularly to systems which provide an ability to capture video, photos and/or other documentation related to an event, inspection, transaction or other matter which preferably may relate to the completion of a report. The use of configurable and interactive graphic overlays placed within the video functionality of a mobile device provides user specific steps to take or questions to answer to assure a report is completed correctly, and can provide visual documentation for some embodiments to show that the matter in the report has been completed.

CLAIM OF PRIORITY

This applicant claims the benefit of U.S. Patent Application No. 62/801,435 filed Feb. 5, 2019, which is included herein by reference in its entirety.

BACKGROUND OF THE INVENTION

Mobile devices such as smartphones, tablets, digital cameras, and other mobile processors have changed the way society communicates, records information and accesses educational information. This evolution has created a demand for systems that replace traditional paper forms and checklists. Additionally, it is estimated that 80% of employees are deskless, thereby creating a need for more efficient reporting.

Paper checklists have been utilized in combination with cameras, such as on mobile devices such as smartphones, tablets, portable computers and/or other mobile devices to video record information such as could occur with a home inspection such as to obtain pictures of certain portions of the home, a rental company which might rent out equipment to verify condition of delivery or turn-in and/or vehicles to have an individual walk around the vehicle and record the exterior and/or interior of that vehicle either upon renting it or upon receiving it back.

However, even with advances in the technology there is still a need to provide improvements to ensure that a comprehensive report according to the desires of a business or other entity are obtained and there is not inadvertently, or otherwise, information left out of a particular report which was intended to be gathered. Improved reporting methods are believed to be desirable. Litigious environments also benefit from more detail and visual support to report documentation.

SUMMARY OF THE INVENTION

It is the object of many embodiments to provide an improved reporting system which preferably simultaneously provides a text (and/or graphic) overlay over a display set to capture video so that what the user is advised of specific steps to take or questions to answer may be displayed on the display while taking the video of the information to be obtained, possibly providing an audio read graphic overlay for some applications.

It is the object of many embodiments to provide an improved method of visual reporting which may include an interactive screen so that while recording, a user may be able to advise of a pass, fail and/or comment section as it relates to being able to input data preferably by videotaping and/or capturing still images simultaneously, possibly by taking an image upon interacting with the display screen.

It is another object of many embodiments of the present invention to provide video reporting system which not only can record but can also capture stills while recording video and/or separately captures stills while recording at a particular instance of time such as when a failed condition or specific item worthy of notation is reported to be able to provide a photograph of the failed condition with an image of a situation at the time failure is indicated by the user.

It is another object of many embodiments of the present invention to provide an improved recording system and method.

Accordingly, in accordance with the presently preferred embodiment of the present invention, an improved recording system can replace traditional paper forms to provide for electronic documentation that can be utilized to gather information through video recording in addition to collecting with writing, typing, images and/or other methods of recording events. The technology described herein may include a video based recording system that can replace a strictly paper system and/or other systems in order to capture information desired to be obtained so as to potentially provide an accurate and/or comprehensive documentation of an event, customizable for use in many industries, such as an inspection, an accident report, a transaction or other situation, that may benefit from the completion of a formal report. Such technology may not only improve the efficiency and/or ease of completing such reports, but also may provide visually documented proof that the report, inspection, and/or transaction was completed as intended. Not only can a report and/or summary potentially be generated and/or viewed in some embodiments, but also the video behind the report may be made available for quality assurance to ensure that a specific report is accurate so as to have a supervisory capability over particular reports. Video may be converted to a digital document form as well for at least some embodiments.

The applicant's methodology may not only can capture a user or creator of the report such as by capturing the user's ID and/or signature. Date and/or time stamping the report as well as geo-stamping the report to potentially aid in compliance and/or legal scenarios as well could also occur. In some preferred embodiments providing an ability for software to be launched from a mobile device, such as a smartphone, tablet, portable computer and/or other appropriate technology may be provided so as to load an appropriate set of overlays which may be questions or required actions for a specific report which can be associated with a unique report ID that can be captured on the user's mobile device such as in a variety of ways including a voice command such as speaking in the report from a menu, scanning a barcode, a Q-code or inputting other ID possibly without manually entering a report name. Of course, entering the report may also occur with some embodiments. The methodology of the applicant's technology could utilize a report ID to capture at the client level to generate an API to communicate with a server or other backend management system which could then return the specific interactive report overlay to the client (i.e., the mobile device). When receiving the specific overlay(s), the client (mobile device) can potentially automatically open the video screen and load the first of a series of overlays on the video screen to capture at least some of the start and end dates, time and geographic location of the client, user, company, etc. when the video screen was open (or during the time it is open) generate a report through the operation of the methodology.

The technology preferably advances through a series of overlays automatically or through some form of interaction with the user. A user can answer questions and/or complete actions on the mobile device such as using a camera and/or microphone (potentially simultaneously with the videoing) to capture video footage and/or audio of the user's narrative responses, their surroundings and any other assets or objects that are relevant to the report. The overlays presented may not only include just static questions, such as video of right fender or right wheel, but may also be interactive elements such as potentially also including "pass, fail and/or comment" so as to be able to advise why a situation is not satisfactory such as a nail hole in a tire, etc., a scratch exceeding a predetermined sufficiency such as to be charged to a customer, etc.

Additionally, at least some embodiments of the present invention find an ability to capture still images while utilizing an interactive overlay button on the video screen without interrupting the video being captured by a mobile device in one of a variety of manners. Specifically, it is possible to simultaneously take a picture while the video is being uploaded and/or take a specific still out of the video simultaneously while the video is being running. Still other methods may be to capture images in various embodiments while video is being captured.

It may be possible to some embodiments to not be able to advance to the next template until the current template is completed. Additionally, some embodiments of the applicant's technology has a flexibility to have the client begin immediately uploading the visual report to the backend management system. Still others may provide the user the ability to preview the visual report and/or still images captured within the report prior to uploading. During a step, or during review, it may be possible for the client (mobile device) to add additional notes either through writing, audio, camera image(s), video, to potentially enhance the quality of the report. Furthermore, it may be possible in some embodiments for the user to be able to add additional templates.

Prior to uploading the visual report, the user may be prompted to sign their name utilizing the device screen or otherwise. Once the signature is accepted, a visual report may be generated and/or then uploaded either through cellular and/or internet transmission or other wired or wireless means of connectivity. The upload may pass through a port and potentially be passed in combination with user ID, photos, date, time, video, geographic location and/or signature to be passed to the backend management system.

The date and/or report may also be potentially stored not only by the client (i.e., mobile device) for some embodiments (or not for still other embodiments). Not only can the information gathered in video be uploaded as a portion of a report, it may also be gathered and/or converted to a paper form or document that can be utilized for compliance or authenticated proof of completion such as the generation of a report potentially with the signature of the report taken, i.e, the client. Preferably the report may be delivered to a backend management system which can preferably be hosted on a cloud-based or physical servers.

Additionally, an ability to notify predetermined contacts that a report has been completed and/or a specific work order generated such as if a failed situation is reported. Additionally, specific templates may be brought up as a result of specific reports, i.e, if a tire is indicated to be a failure, it may be possible to upload a work order such as plug a hole in a tire, replace a tire and/or other specifics may be provided such as is the tire capable of being repaired, should the tire be replaced, etc. The tire change technician and/or repairman may be advised of such a situation either through text or otherwise so as to be able to implement the steps of causing the work order to be processed appropriately. Communication with various users can be generated such as from the person generating the report through text, chat, voice and/or other communication methods such as to request additional information or data specific to a report. For example, in the event a user has generated a video report for an accident, the risk management team may be able to almost instantly review content and correspond with the user to request additional information or photos. For instance, when taking the video the risk management team might observe the start of a skid mark behind a tire.

It may be that the risk management team then request the user to then go video the length of the skid mark so as to be able to provide that information to the risk management team. Still other information may be gathered in a similar or dissimilar manner.

Other embodiments will have still other features as will be understood by those of ordinary skill in the art.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENT

A client side of the technology can be defined as the hardware used by the "user" or individual generating a report. This could include mobile devices 10 such as smart phone, tablets, cameras and/or laptops but in some situations, could include desktop computers or other devices as well having cameras and/or camera displays. The client side technology may be deployed as an application that will work in a variety of languages that include but not limited to iOS, Android platforms and/or others. The client side technology may be configured to operate as a stand-alone technology or be integrated into other applications that provide additional functionality.

Figure 1:
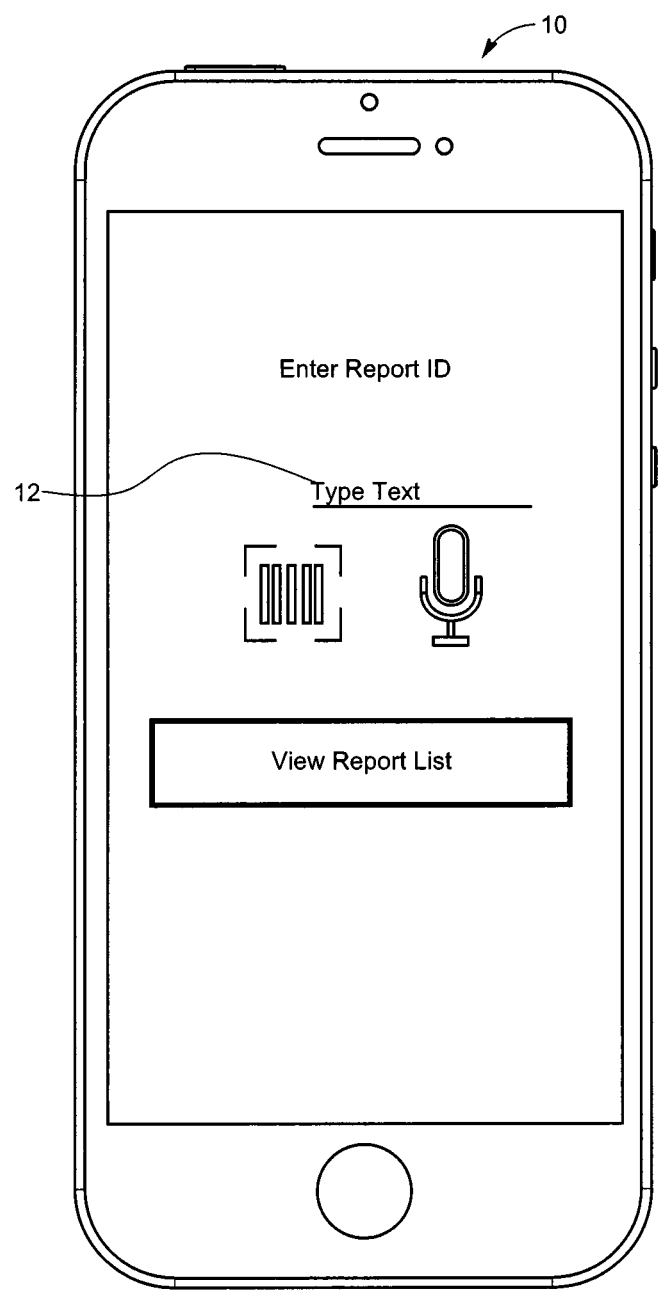
FIGS. 1-7 are front plan views of a smart mobile device having different screen shots of the presently preferred method in operation.
Figure 2:
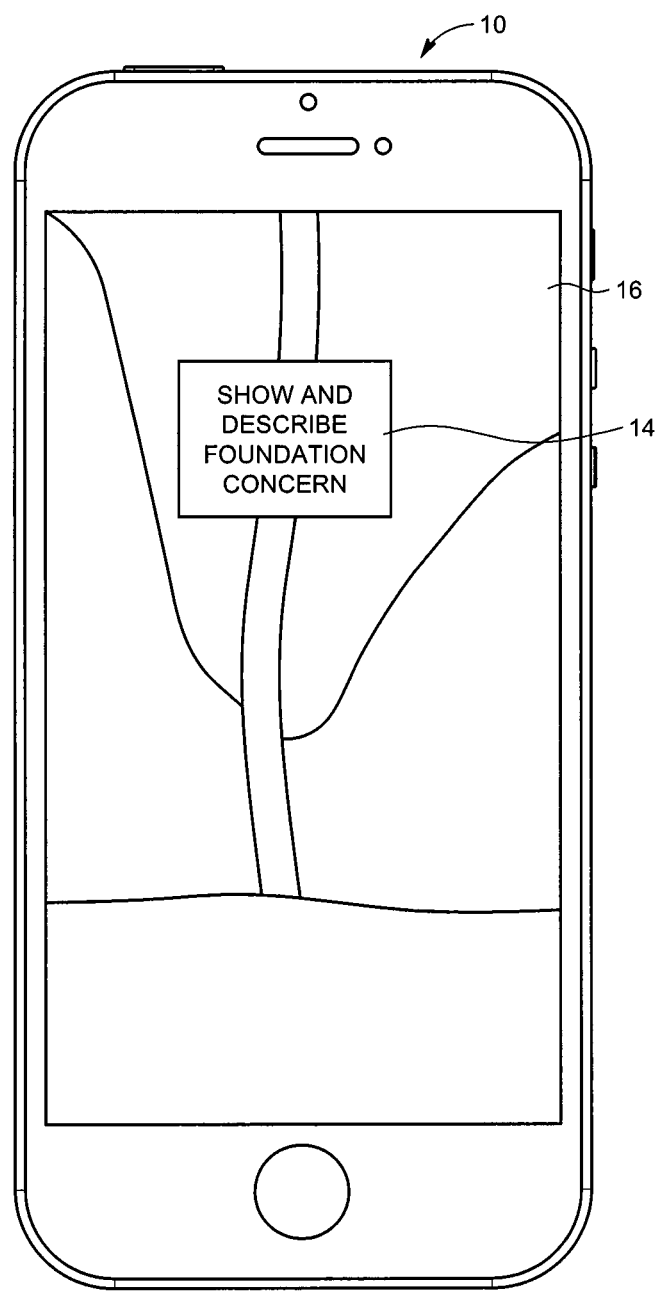
Figure 3:
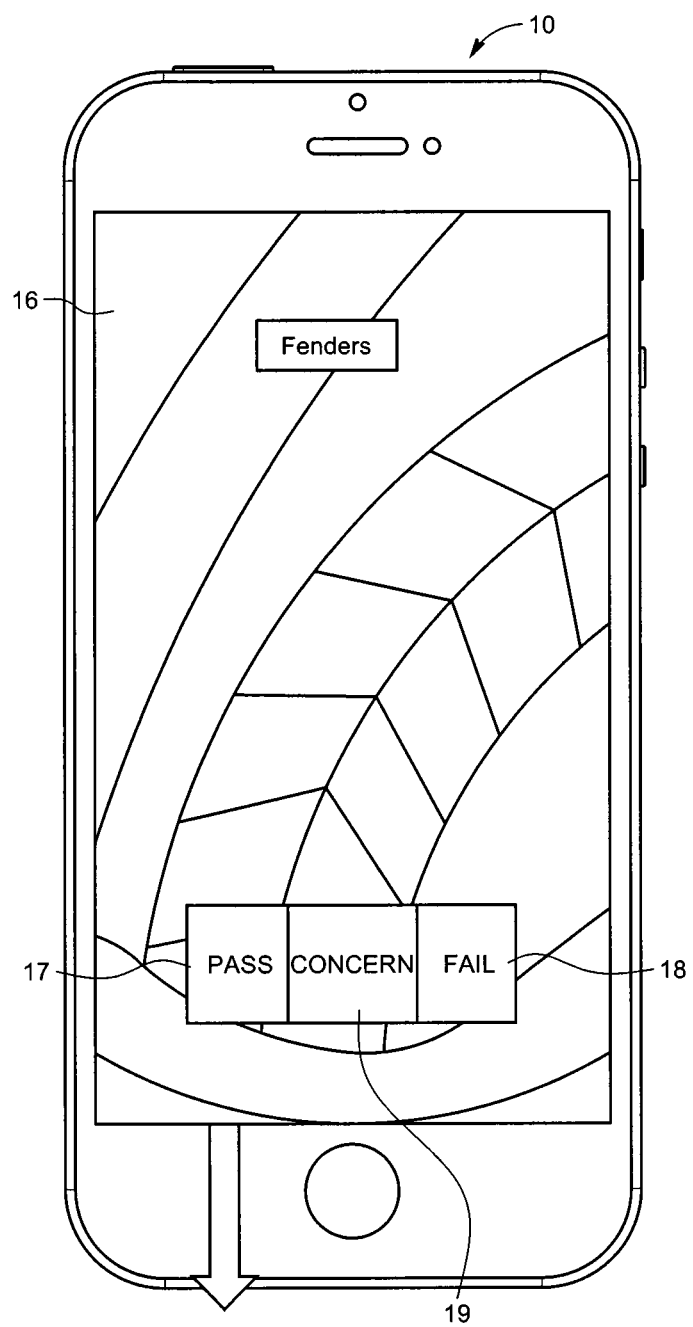
Figure 4:
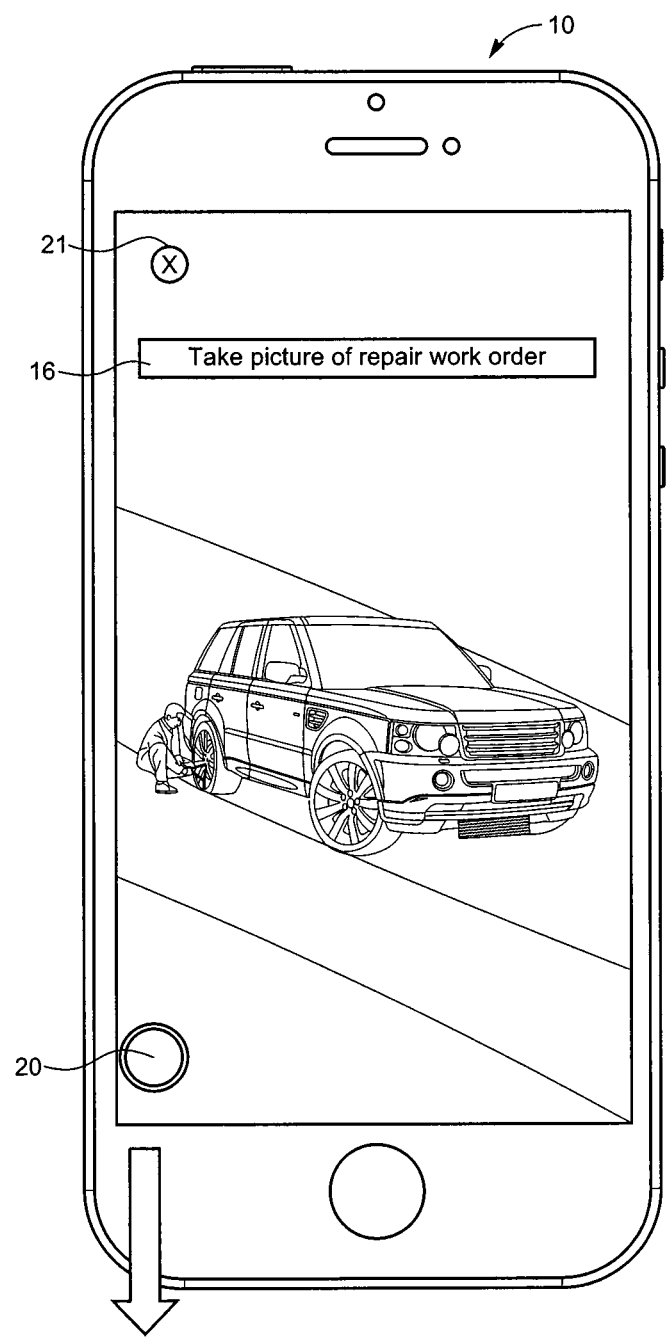
Figure 7:
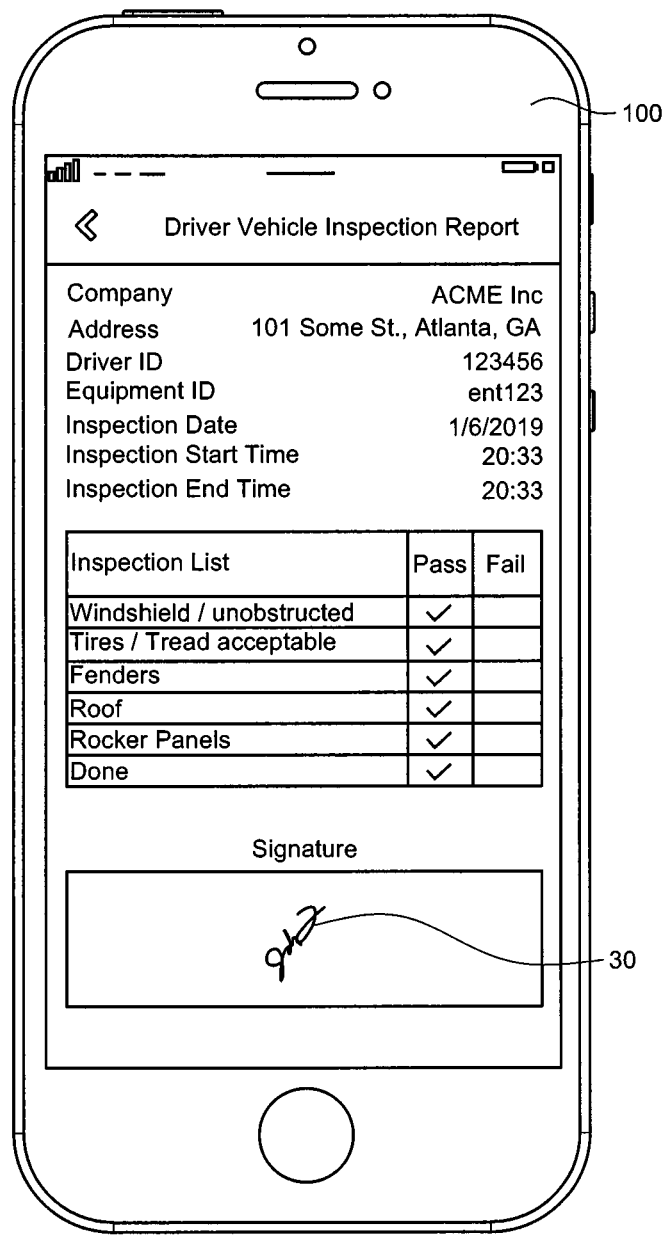
Figure 8:
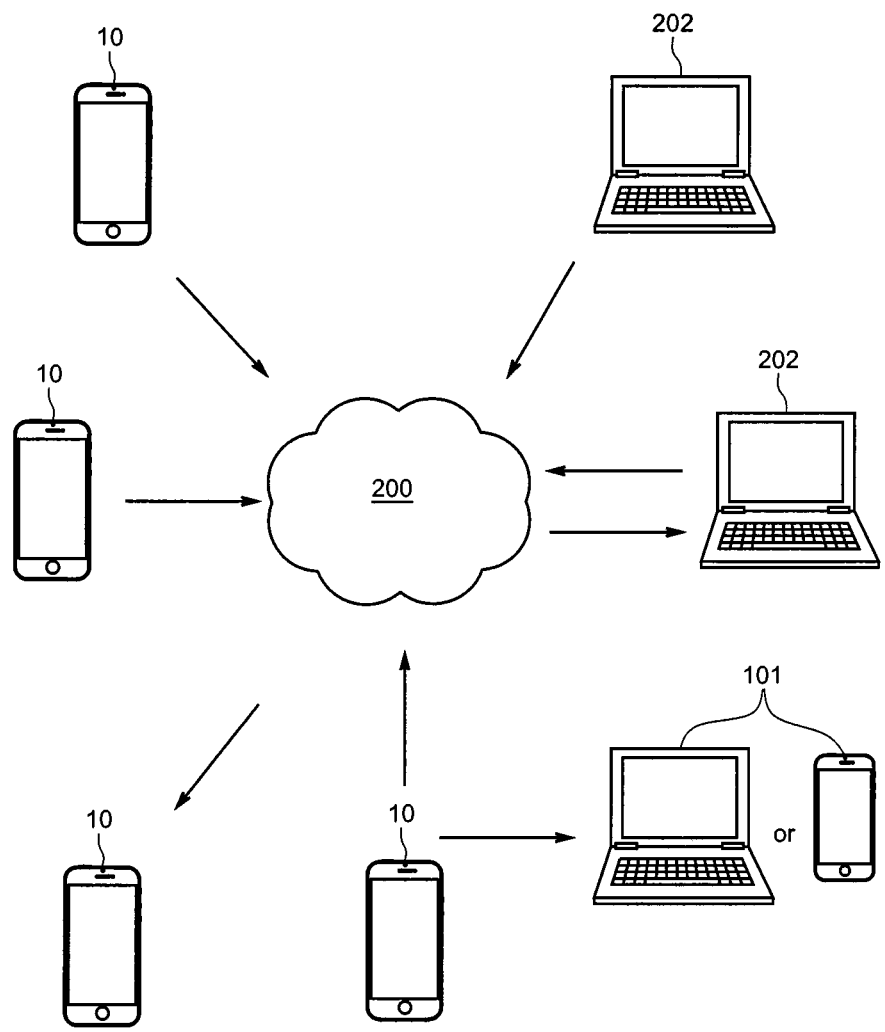
FIG. 8 is a diagrammatic representation of a communication process of the presently preferred embodiment of the present invention showing the mobile device show in FIGS. 1-7 and other components.

A user ID may be entered such as at FIG. 1, FIG. 8 or otherwise provided, if not assigned to a specific device 10. When the application is opened (and/or software otherwise executed) on the device 10 the client side technology may prompt the user to access a specific type of visual report by entering a unique report ID 12 that may be captured on the user's device via a variety of ways such as, but not limited to, voice command (speaking the name of the report), from a menu, scanning a barcode (asset ID, and/or manually entering the report name (FIG. 1) or other entry method. Different inspections, accidents, etc. may have different and/or similar overlays 14-16. Once the ID is captured the client technology may generate as API call to the backend management system which might authenticate the user and then return a report template of specific text/graphic overlays to the client (which may be at least partially pre-generated). Once the report specific overlays are delivered, the client the technology may simultaneously open the device's video camera and loads or otherwise display a first, potentially of a series of specific overlays (FIG. 2). The client side technology may allow the overlays 14-16 to be static such as shown in FIG. 2 or interactive such as shown in FIGS. 3-4 and can even mix the type of overlays based on the specific desires or requirements of a report (FIGS. 3 and 4). Advancement through the series of text/graphic overlays 14-16 is also preferably controlled by the client side technology utilizing either an automated format or through some form or interaction with the user such as touching the overlay 14 and/or other action. The client technology may provide the option of showing or omitting the text/graphic overlays on the completed visual report video. Interactive overlays 15-16 may provide for additional actions by the user other than merely recording video. For instance, interactive overlay 15 provides an ability to pass, fail or identify concern in the fender area of the vehicle such as with the tire and/or other location. Specifically, if a fail button 17 is clicked, then an instantaneous picture may be taken preferably while the video is still running either by simultaneously taking a picture while the video is being filmed and/or capturing a still of the series of images from the video as being running and assigning it to the failed condition for use in a report. Meanwhile a concern could be identified by pressing a button 19 and/or a pass 18 could be pushed which could then be utilized to generate a report 100 as is shown in FIG. 7 to be described in further detail below.

Other interactive buttons 17-20 and/or features could be provided such as overlay button 20 which could allow for the taking of photographs without interrupting the video. It is estimated that the interactive buttons 17-20 may perform actions other than modifying the image recorded by the video. This is not believed to be done by any prior art.

Specifically, it is not believed possible to simultaneously take a photograph while also recording video with a mobile device such as a smart phone, tablet or mobile computer, potentially by using the display. Advancing to another overlay 14-16 may not be possible without first recording video for that overlay (or even the correct video content as described herein).

It is also not believed possible to identify a condition to simultaneously display an dynamic/interactive overlay advising the user as to what he or she should be filming much less an interactive overlay 17-20 which allows for a specific action to be identify and/or taken other than filing video (or modifying the video such as by changing the brightness or zooming in and out). Specifically, the interactive actions of 17-20 either take a picture apart from the video and/or identify a condition related to the video preferably for use in generating a report 100 as is described herein. At least some embodiments may have an ability to revert/go back to previous overlays and/or advance back to current overlays.

A special functionality that the client technology may provide is a capability to execute dual functionality of the device camera. This capability may allow the user to capture a photo using an interactive overlay button 20 on the video screen without interrupting the video that is recording the reporting process (FIG. 4). The (x) 21 or other button may be pushed to stop taking the video.

Figure 5:
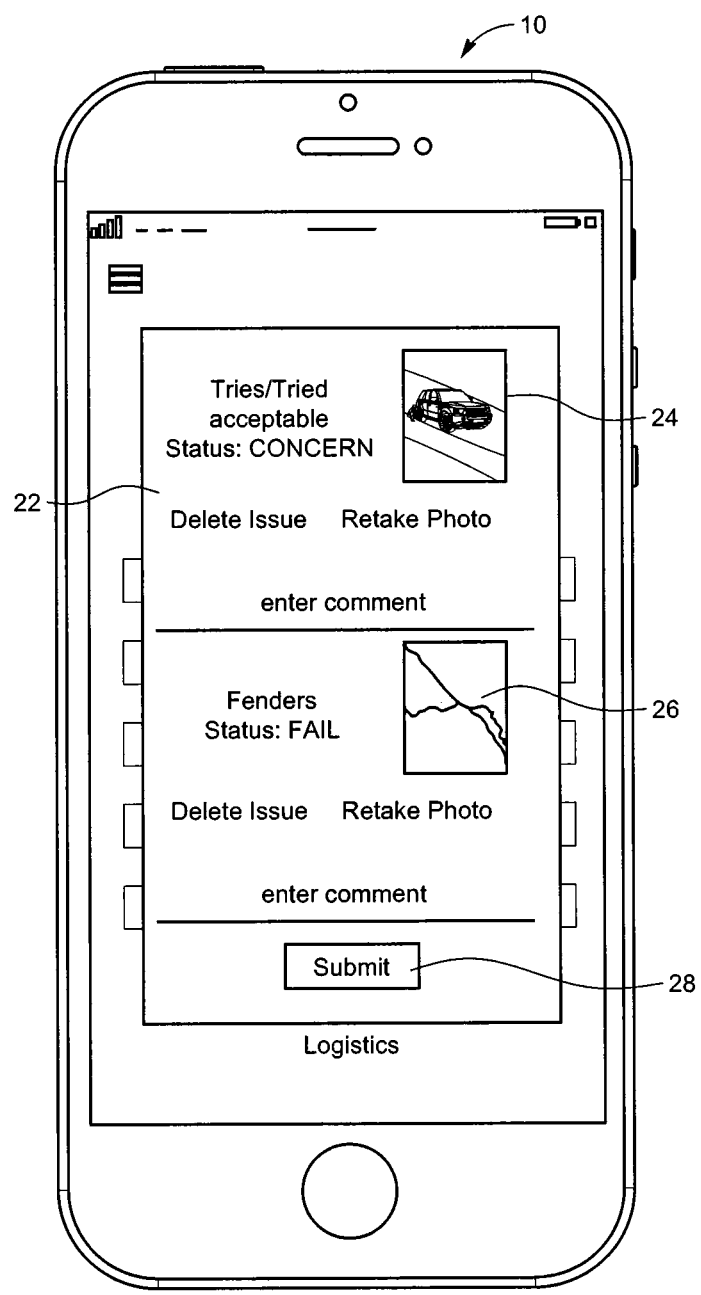
Figure 6:
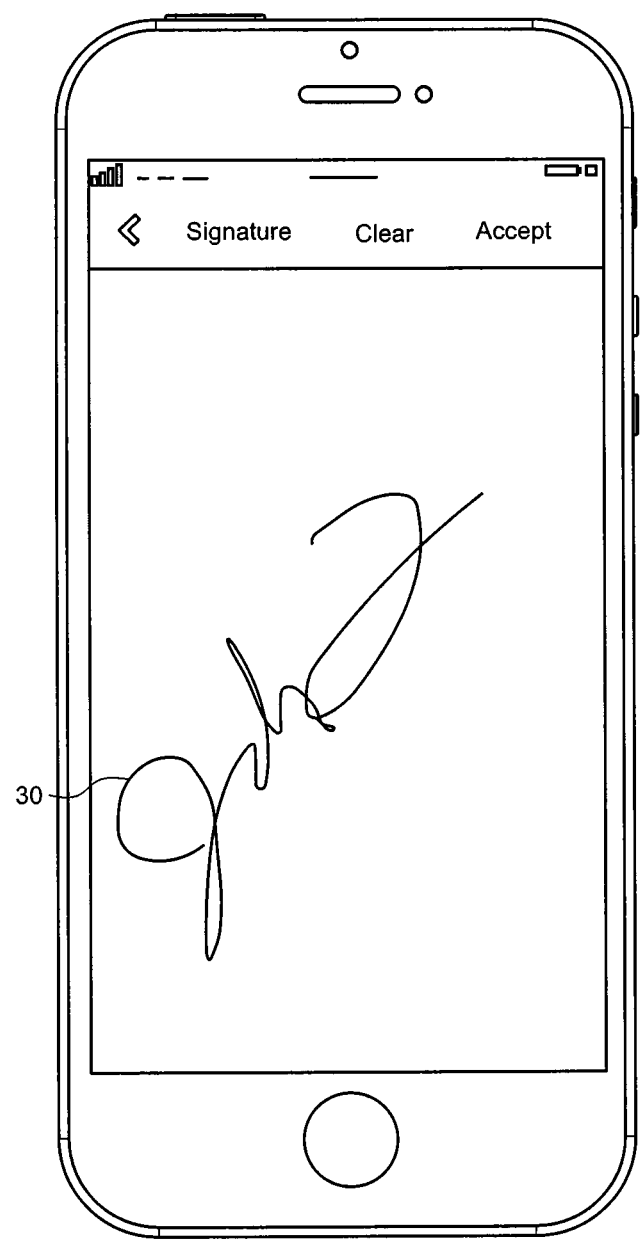

Upon the user's completion of the report's questions or requested actions, the client side technology may provide the user a capability to review a report 22 or still image captures 24,26 during the report prior to uploading (FIG. 5). During this preview step the technology may allow the user to add any additional notes to the photos or capture additional video reporting footage (or audio) to possibly enhance the report. Editing of material may be possible as well. Once the user approves the visual report content for upload with button 28 or otherwise, the technology may prompt the user for signature 30 by using their finger to sign on the screen (FIG. 6). The user may approve the signature capture and the visual report upload process may begin. The upload process may pass the user ID information, type of visual report and any photos, date, time, geographic location, and/or signature to the backend management system 200 and/or generate a report form 100 prior to uploading such as a DOT report or other report.

The client side may upload through Cellular, Internet based and/or other transmission preferably (if not maintained locally) but if the technology determines that neither is available it may store data until a connection is found. The client side technology may allow the information gathered in the video based reporting to be converted to a form or document that can be stored on the device for compliance reasons or proof of completion in the event of an audit or inspection by any applicable authority as well (FIG. 7).

The technology's backend management system's 200 (as shown in FIG. 8) capabilities could be divided into three primary functions; create, manage and deployment of video reports, capturing, storing and sorting of completed video reports and applicable data, and the customized reporting functionality.

The backend management system 200 may be designed to allow designated individuals (client/customer administrators, etc.) the capability to create video reports and/or fill out forms for use by the user (such as DOT forms or other forms) with an easy to use interface. Each report may be created by assigning a report ID for the new report then the technology walks the administrator through the process of entering content/questions/required actions that make up the report. The technology may have the capability to utilize an algorithm to feed the next question or required action overlay based on the previous answer or action of the user if not performed on the client side. Some embodiments may be able to identify if the correct structure is videoed as requested by an overlay. The backend system 200 may also allow the designated administrators to modify content and order of overlays in existing Visual Reports. The developed reports could be linked to multiple user profiles, asset IDs, and situational scenarios providing a very flexible deployment option to client side devices (mobile devices 10).

Work orders, training items, accident reports and/or other reported items may be generated by the system 200 (such as to a supervisor, etc.) using at least portions of the report taken by the user. It may be uploaded quickly so as to be able to have quality control or other personnel have the user obtain additional information or conduct communication in near to or in real time.

Once a visual report is completed and uploaded from the client (mobile device) the backend management system 200 may capture the report video and all other data and organizes the content into user-friendly content review screen where the visual report video could be viewed, the time and date stamp possibly displayed, geographic location map possibly displayed, along with any other report data such as captured photos, user notes, and/or required follow up actions. This content review screen could also provide links to any other video reports and data related to a specific event, action, or assets, work orders could be generated and/or fiving information to others to advise of conditions and/or issues.

Given number of visual reports and corresponding data that could be collected and stored, such as in storage 202, the backend management system could be equipped with the capability to sort and organize data in numerous ways. The information can be accessed by a reporting structure or transferred to other servers where the data can be paired with other information. The backend management system's reporting structure provides the flexibility to customize reports for specific needs and situations.

FIG. 8 shows visual reporting workflow illustrations of the mobile device 10 in cooperation with the visual reporting Back End Management System (BMS 200) as well as access from designated users such as from storage 202 as well as supervisor 101. Specifically the mobile device 10 can pass user ID for authentication and report ID to access report overlays to the Back End Management System 200. The Back End Management System 200 can authenticate users and/or prompt users to enter report type or ID from the mobile device 10. The Back End Management System 200 can also provide report specific interactive overlays to be displayed to the mobile device 10 if not already provided thereon. The mobile device 10 using the client's technology can open the device video camera and/or load report specific overlays such as first overlay, second overlay, etc., in the order as prescribed by the report type or ID or otherwise.

The mobile device 10 with the client's technology may capture the date time, geolocation of the user and pass information along with the user ID to complete the visual report video, still images and or user's signature back to the server or storage 202 at the Back End Management System 200. A supervisor 101 may receive notification via email, text or otherwise, that a visual report has been completed by a user and access report data via link or otherwise. Furthermore, designated users 202 can request view of visual reports, applicable data, possibly from reports for specific applications or other purposes. Designated users 202 may also set up visual report content and manage users from the Back End Management System 200. Still other applications can be provided for various embodiments. These and/or other applications can be provided with various embodiments.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the intention are intended to be included within the scope of the appended claims.

Having thus set forth the nature of the invention, what is claimed herein is:

1. A paperless image-based reporting system method:
   a) a user providing an indication to a server requesting to generate a specific report, and then;
   b) displaying a first graphic overlay electronically on a camera display on a mobile device of the user, said mobile device selected from the group of a smartphone, tablet, computer and digital camera, said first graphic overlay providing instructions related at least one first image to be captured;
   c) then capturing the at least one first image as instructed by the first graphic overlay;
   d) the user directing the customization of a report differently than as specified by the server;
   e) automatedly creating a report as a form with information related to the first graphic overlay; and
   f) sending the report and the first image remotely from the mobile device to a server.

2. The paperless image-based reporting method of claim 1 wherein before automatedly creating the report, further comprising a second graphic overlay displayed on the camera display of the mobile device after capturing the at least one first image, and then capturing at least one second image as instructed by the second graphic overlay, and then when automatedly creating the report, provide information related with the second graphic overlay coupled with the at least one second image.

3. The paperless image-based reporting method of claim 1 wherein the first graphic overlay provides at least one of (a) specific steps to take and (b) questions to answer to accompany the at least one first image.

4. The paperless image-based reporting method of claim 1 wherein with the first graphic overlay displayed on the screen, an input of the mobile device receives and displays responses, the input being a keyboard which provides one of (a) yes, (b) no, and (c) a comment.

5. The paperless image-based reporting method of claim 1 wherein the first graphic overlay relates to one of an inspection, an accident report and a transaction.

6. The paperless image-based reporting method of claim 1 wherein the first graphic overlay has an active button displayed thereon wherein upon pushing the active button a picture is captured by a camera separately while simultaneously recording video with the camera as at least one first image without interruption by obtaining the still image, with the picture taken apart from the video.

7. The paperless image-based reporting method of claim 1 wherein a user ID is assigned to the report.

8. The paperless image-based reporting method of claim 7 wherein the user ID is provided by a user of the mobile device.

9. The paperless image-based reporting method of claim 8 wherein the user ID is a finger signature by the user, and is provided with the report.

10. The paperless image-based reporting method of claim 1 wherein the mobile device provides at least one of a date stamp, a time stamp and a location stamp relating to the mobile device at the time of capturing the at least one first image.

11. The paperless image-based reporting method of claim 1 wherein the report is sent through one of cellular and wireless to the server from the mobile device, and the report includes the at least one first image.

12. The paperless image-based reporting method of claim 1 further comprising the step of retaining the report on the mobile device.

13. The paperless image-based reporting method of claim 1 wherein the first graphic overlay is launched before capturing the at least one first image through one of (a) scanning a bar code; (b) scanning a Q-code, (c) speaking a report request, (d) inputting a report request through an input of the mobile device, and (e) selecting from a menu.

14. A paperless image-based reporting system method:
   a) displaying a first graphic overlay electronically on a camera display on a mobile device, said mobile device selected from the group of a smartphone, tablet, computer and digital camera, said first graphic overlay providing instructions related at least one first image to be captured with a camera;
   b) then capturing with the camera the at least one first still image as instructed by the first graphic overlay while simultaneously capturing a first video with the camera wherein said first video is uninterrupted when capturing the first still image while capturing the first video, and the first still image is captured apart from the first video while continuing to capture the first video;

c) automatedly creating a report with information related to the first graphic overlay coupled with the at least one first image; and d) sending the report and the at least one first image remotely from the mobile device to a server.

15. The paperless image-based reporting method of claim 14 wherein before automatedly creating the report, further comprising a second graphic overlay displayed on the camera display of the mobile device after capturing the at least one first image, and then capturing at least one second image as instructed by the second graphic overlay, and then when automatedly creating the report, provide information related with the second graphic overlay coupled with the at least one second image.

16. The paperless image-based reporting method of claim 15 wherein the second overly has an active button, whereby when activated, the camera display returns to the first graphic overlay to obtain another image of the at least one first image.

17. The paperless image-based reporting method of claim 1 wherein the specific report is generated from an asset ID provided by the user.

18. The paperless image-based reporting method of claim 1 wherein the at least on image further comprises at least a first video and the first video is a portion of the report.

19. The paperless image-based reporting method of claim 1 wherein the at least one image is checked to identify if the at least one image relates to specific structure requested to be imaged on the overlay before sending the report to the server.

* * * * *